Aug. 20, 1946.  A. J. LEVIN  2,406,084
SHIP OR VESSEL
Filed March 24, 1945
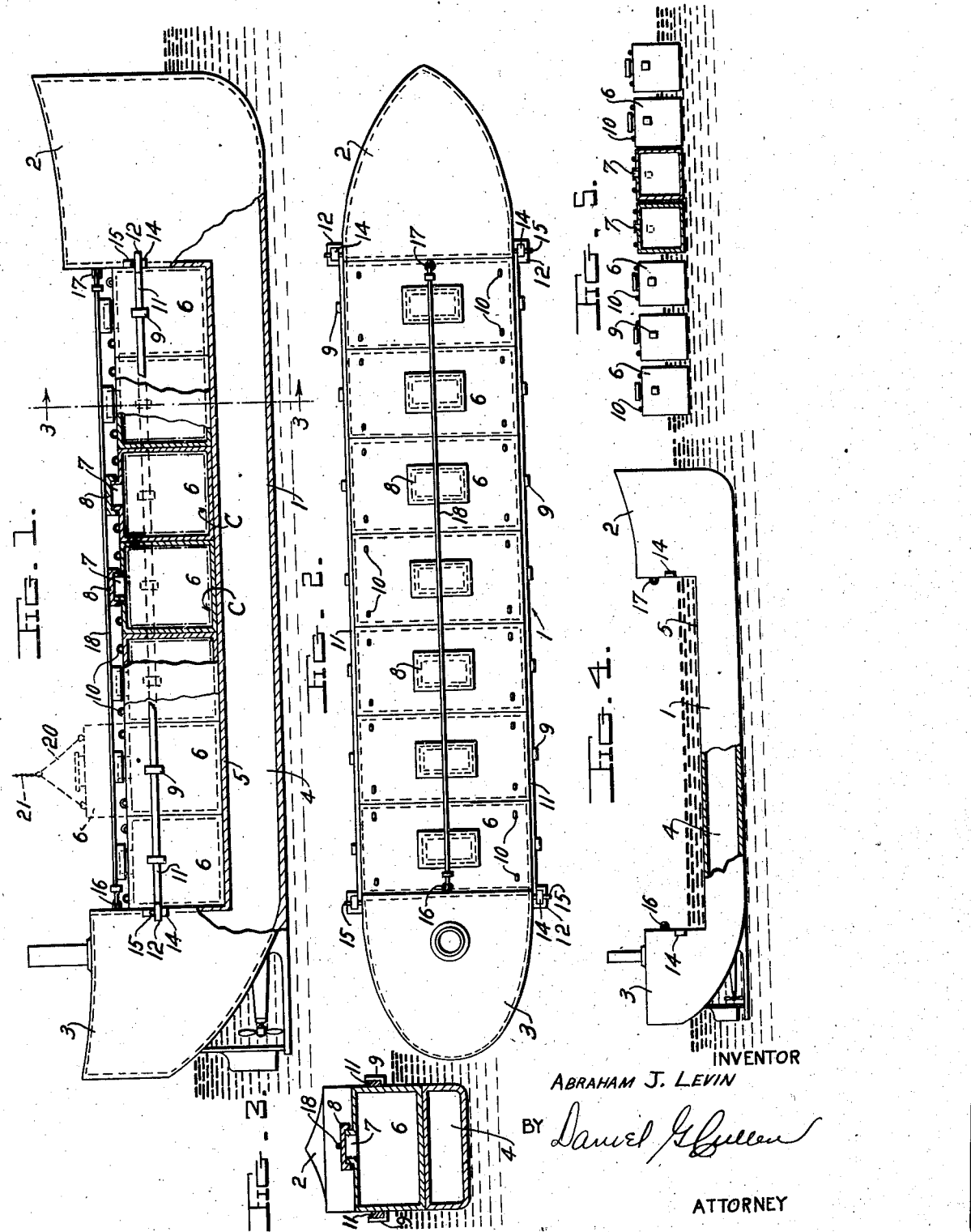
INVENTOR
ABRAHAM J. LEVIN
BY
ATTORNEY Patented Aug. 20, 1946

2,406,084

UNITED STATES PATENT OFFICE 2,406,084

SHIP OR VESSEL

Abraham J. Levin, Detroit, Mich.

Application March 24, 1945, Serial No. 584,607

9 Claims. (Cl. 114—77)

This application relates to ships or vessels, and more particularly to vessels comprising various floating members which are floated into relative assembly and then relatively secured while floating so that a complete vessel is formed.

An understanding of the vessel herein disclosed may be obtained upon reference to the appended drawing, in which Fig. 1 is a side view, Fig. 2 is a top plan view, Fig. 3 is a section view as if on line 3—3 of Fig. 1, Fig. 4 shows one of the members of the vessel isolated from the others of Fig. 5, and Fig. 5 shows others of the members of the vessel isolated from the member of Fig. 4.

The drawing shows an assembled vessel comprising a hull member 1, having its prow and stern sections 2 and 3 considerably above its amidship section 4 which is generally below the water level indicated. The hull contains space for equipment, personnel, stores, fuel, etc., but is shown as devoid of any substantial cargo space so that the hull floats at about the same level at all times. To insure that the hull floats at about the same level at all times, provision may be made for the replacement of consumed fuel, stores, etc., by water so that on a journey, as fuel and stores are consumed, the tendency of the hull to rise will be offset by the taking on of water as ballast to maintain the buoyancy substantially the same at all times.

While it is contemplated that hull 1 is not to be used for cargo, it is possible that the hull may be designed to receive some cargo; but, in any event, section 4 should, at all times, be submerged.

Between the prow and stern sections is a space 5 in which may be disposed a plurality of cargo-containing tank members 6. These are hollow and buoyant and each is capable of being floated into or from space 5 of the hull. Each tank is provided with an opening 7 for which there is a movable closure 8. Cargo and ballast may be introduced into or removed from each tank through the opening 7, and for this purpose each tank may be compartmented in any suitable manner to separate cargo from ballast within it.

It is contemplated to load each tank, either on land, or while floating, with cargo and, if necessary, with ballast, so that the tanks when floating, either during the loading, or after the tank is loaded and moved to a body of water where it can be floated, will float at about the level indicated in Fig. 5 which is the level of buoyancy of the tank at all times. Such level is maintained by adding or subtracting cargo or ballast. The level is pre-determined for each tank so that a tank may float at such a level so that it can be floated into the space 5 of the hull, with the result that a plurality of such tanks may be floated into the space 5 of the hull to fill it and thus together with the hull form a complete vessel of more or less conventional shape whose sides are formed by the merging sides of the hull and the tanks, the hull and the tanks being of the same width, and whose deck, between prow and stern, comprises the aligned top surfaces of the tanks when disposed in the space 5 of the hull.

Each tank is provided with rings 9—10 on its sides and top for purposes later to be described.

Two alternatives for loading and use and assembly of the vessel are suggested.

It is possible and preferable, especially for ocean traffic, to increase the loading of each tank after it has been floated into assembly with the hull and disposed in the space 5 thereof so that the individual tanks will not float freely but will rather be supported partly by the hull. In such a case, part of the support for the individual tanks will be the hull and part will be the buoyancy of the tanks themselves which though less than the buoyancy before assembly is still sufficient to float the tanks, if they became separated from the hull, though at a lower level than when they were being floated into assembly with the hull. In such a case, means may be utilized to fasten the tanks and hull relatively, and, in such a case, the means may be rigid fasteners such as will rigidly secure the tanks and the hull against relative movement, not only laterally and longitudinally, but also vertically. Such means may take the form of side-locking bars 11 whose ends 12 are disposed in locking brackets 14 of the hull, with suitable locking bolts 15 being employed to lock the bars 11 to the brackets 14. The bars 11 will pass through the rings 9 on the sides of the tank, and in this way, the tanks will be locked against any relative motion with respect to the hull. For additional protection and locking, there may be provided on the hull rings 16 and 17 which may be connected by a cable 18 overlying the closures 8 and thus assisting in preventing relative movement in a vertical direction of the tanks and the hull. In such a case, disassembly may require a decrease in the loading of the tanks before they are separated from the hull so that they can be floated off and away from the hull.

It is also possible, and for river or canal traffic it may even be found preferable, to design the members and their loading in such a way that each member floats at substantially the same level after assembly as before and during assembly, so that each member is individually buoyant and free floating not only before assembly but during and after assembly. In such a case, all members will float at substantially the same level before, during, and after assembly, and the tanks will float free of one another and of the hull after assembly so as to be individually free floating. In such a case, the various members may be relatively secured in assembly by any suitable securing means so that relative lateral and longitudinal separation of the hull and tank will be prevented, without, however, interfering with the slight amount of relative vertical movement that will take place during the normal movement of a floating vessel consisting of a free floating hull and free floating tanks disposed within the space 5. The means may be flexible connectors such as cables or chains, or any other suitable means, and since the detail of construction of the means forms no part of the present invention, no effort is made to disclose in detail such means.

While it is contemplated that the assembly and the disassembly of a tank with respect to a hull may be effected best by floating the tank to and from the space 5 of the hull, it may be desirable to use the rings 19 with a sling 29 and a fall 21 to enable a tank to be lifted bodily out of its position in space 5 or placed into such position.

Now having described the assembled vessel herein disclosed, reference should be had to the claims which follow.

I claim:

1. An assembled vessel comprising a hull member having its amidships section considerably below its prow and stern sections, the hull generally being substantially free of variable load factors so as generally to have a substantially non-variable buoyancy, the hull normally floating with its amidships section well below the water level and with its prow and stern sections well above the water level, and a plurality of cargo-containing tank members, each being hollow and buoyant and each being capable of being floated into the hull to occupy the space therein above the amidships section, and to fit between the prow and stern sections, the hull and the tanks being individually buoyant, before, during, and after assembly, each member floating at substantially the same level after assembly as before and during assembly with all members floating at substantially the same level, the tanks having means for permitting their buoyancy to be adjusted so that they can float free of the hull even after assembly, the tanks and hull being so shaped that when relatively assembled they form a vessel, all of whose members float, and means for relatively securing the tanks and hull against relative separation when relatively assembled with the tanks and hull individually floating.

2. An assembled vessel comprising a hull member having its amidships section considerably below its prow and stern sections, the hull generally being substantially free of variable load factors so as generally to have a substantially non-variable buoyancy, the hull normally floating with its amidships section well below the water level and with its prow and stern sections well above the water level, and a plurality of cargo-containing tank members, each being hollow and buoyant and each being capable of being floated into the hull to occupy the space therein above the amidships section, and to fit between the prow and stern sections, the hull and the tanks being individually buoyant, before, during and after assembly, each member floating at substantially the same level after assembly as before and during assembly with all members floating at substantially the same level, the tanks having means for permitting their buoyancy to be adjusted so that they can float free of the hull even after assembly, the tanks and hull being so shaped that when relatively assembled they form a vessel, all of whose members float and means for relatively securing the tanks and hull against relative separation when relatively assembled with the tanks and hull individually floating, all members having the same width so that the sides of the tanks and the sides of the hull are in substantial alignment.

3. An assembled vessel comprising a hull member having its amidships section considerably below its prow and stern sections, the hull generally being substantially free of variable load factors so as generally to have a substantially non-variable buoyancy, the hull normally floating with its amidships section well below the water level and with its prow and stern sections well above the water level, and a plurality of cargo-containing tank members, each being hollow and buoyant and each being capable of being floated into the hull to occupy the space therein above the amidships section, and to fit between the prow and stern sections, the hull and the tanks being individually buoyant, before, during, and after assembly, each member floating at substantially the same level after assembly as before and during assembly with all members floating at substantially the same level, the tanks having means for permitting their buoyancy to be adjusted so that they can float free of the hull even after assembly, the tanks and hull being so shaped that when relatively assembled they form a vessel, all of whose members float and means for relatively securing the tanks and hull against relative separation when relatively assembled with the tanks and hull individually floating, all members having the same width so that the sides of the tanks and the sides of the hull are in substantial alignment, the tanks having their top surfaces aligned, when assembled in a hull, so as to form a deck.

4. An assembled vessel comprising a hull member having its amidships section considerably below its prow and stern sections, the hull generally being substantially free of variable load factors so as generally to have a substantially non-variable buoyancy, the hull normally floating with its amidships section well below the water level and with its prow and stern sections well above the water level, and a plurality of cargo-containing tank members, each being hollow and buoyant and each being capable of being floated into the hull to occupy the space therein above the amidships section, and to fit between the prow and stern sections, the hull and the tanks being individually buoyant, before assembly, the tanks having means for permitting their buoyancy to be adjusted, the tanks and hull being so shaped that when relatively assembled they form a vessel, and means for relatively securing the tanks and hull against relative separation when relatively assembled.

5. An assembled vessel comprising a hull member having its amidships section considerably below its prow and stern sections, the hull generally being substantially free of variable load factors so as generally to have a substantially non-variable buoyancy, the hull normally floating with its amidships section well below the water level and with its prow and stern sections well above the water level, and a plurality of cargo-containing tank members, each being hollow and buoyant and each being capable of being floated into the hull to occupy the space therein above the amidships section, and to fit between the prow and stern sections, the hull and the tanks being individually buoyant, before assembly, the tanks having means for permitting their buoyancy to be adjusted, the tanks and hull being so shaped that when relatively assembled they form a vessel, and means for relatively securing the tanks and hull against relative separation when relatively assembled, all members having the same width, so that the sides of the tanks and the sides of the hull are in substantial alignment.

6. An assembled vessel comprising a hull member having its amidships section considerably below its prow and stern sections, the hull generally being substantially free of variable load factors so as generally to have a substantially nonvariable buoyancy, the hull normally floating with its amidships section well below the water level and with its prow and stern sections well above the water level, and a plurality of cargo-containing tank members, each being hollow and buoyant and each being capable of being floated into the hull to occupy the space therein above the amidships section, and to fit between the prow and stern sections, the hull and the tanks being individually buoyant, before assembly, the tanks having means for permitting their buoyancy to be adjusted, the tanks and hull being so shaped that when relatively assembled they form a vessel, and means for relatively securing the tanks and hull against relative separation when relatively assembled, all members having the same width, so that the sides of the tanks and the sides of the hull are in substantial alignment, the tanks having their top surfaces aligned, when assembled in a hull, so as to form a deck.

7. An assembled vessel comprising a hull member having its amidships section considerably below its prow and stern sections, the hull generally being substantially free of variable load factors so as generally to have a substantially nonvariable buoyancy, the hull normally floating with its amidships section well below the water level and with its prow and stern sections well above the water level, and a plurality of cargo-containing tank members, each being hollow and buoyant and each being capable of being floated into the hull to occupy the space therein above the amidships section, and to fit between the prow and stern sections, the hull and the tanks being individually buoyant, before, during and after assembly, the tanks having means for permitting their buoyancy to be adjusted so that they do not float after assembly but are supported, at least partially, by the hull, the tanks and hull being so shaped that when relatively assembled they form a vessel, all of whose members can float, and means for relatively securing the tanks and hull against relative separation when relatively assembled.

8. An assembled vessel comprising a hull member having its amidships section considerably below its prow and stern sections, the hull generally being substantially free of variable load factors so as generally to have a substantially nonvariable buoyancy, the hull normally floating with its amidships section well below the water level and with its prow and stern sections well above the water level, and a plurality of cargo-containing tank members, each being hollow and buoyant and each being capable of being floated into the hull to occupy the space therein above the amidships section, and to fit between the prow and stern sections, the hull and the tanks being individually buoyant, before, during and after assembly, the tanks having means for permitting their buoyancy to be adjusted so that they do not float after assembly but are supported, at least partially, by the hull, the tanks and hull being so shaped that when relatively assembled they form a vessel, all of whose members can float, and means for relatively securing the tanks and hull against relative separation when relatively assembled, all members having the same width so that the sides of the tanks and the sides of the hull are in substantial alignment.

9. An assembled vessel comprising a hull member having its amidships section considerably below its prow and stern sections, the hull generally being substantially free of variable load factors so as generally to have a substantially nonvariable buoyancy, the hull normally floating with its amidships section well below the water level and with its prow and stern sections well above the water level, and a plurality of cargo-containing tank members, each being hollow and buoyant and each being capable of being floated into the hull to occupy the space therein above the amidships section, and to fit between the prow and stern sections, the hull and the tanks being individually buoyant, before, during and after assembly, the tanks having means for permitting their buoyancy to be adjusted so that they do not float after assembly but are supported, at least partially, by the hull, the tanks and hull being so shaped that when relatively assembled they form a vessel, all of whose members can float, and means for relatively securing the tanks and hull against relative separation when relatively assembled, all members having the same width so that the sides of the tanks and the sides of the hull are in substantial alignment, the tanks having their top surfaces aligned, when assembled in a hull, so as to form a deck.

ABRAHAM J. LEVIN.